3,371,048
ALKYLPHENOL-ALKYLENEPOLYAMINE
STABILIZING COMPOSITION
Henryk A. Cyba, Evanston, Ill., assignor to Universal
Oil Products Company, Des Plaines, Ill., a corporation
of Delaware
No Drawing. Continuation-in-part of application Ser. No.
329,281, Dec. 9, 1963. This application May 26, 1966,
Ser. No. 553,045
8 Claims. (Cl. 252—403)

ABSTRACT OF THE DISCLOSURE

A stabilizing composition comprising a mixture of an alkylphenol and a dialkylpolyhydroxyalkylalkylenepolyamine, exemplified by a mixture of N,N'-di-sec-octyl-N-hydroxyethylaminoethylethanolamine and from about 1% to about 75% by weight thereof of 2,6-di-tertiarybutyl-4-methylphenol. The composition is useful for stabilizing plastics and rubber, and as an inhibitor for gasoline and lube oil.

This is a continuation in part of copending application Ser. No. 329,281, filed Dec. 9, 1963, and relates to a novel composition of matter comprising a mixture of chemical compounds of specific composition and configuration, as well as to the use thereof.

Parent application Ser. No. 329,281 describes a novel composition of matter of a specific chemical composition and configuration. Also disclosed in said parent application are mixtures of these chemical compounds with other chemical compounds. The mixture is a novel composition of matter and also possesses advantages for use as additives to organic substrates.

The novel compounds claimed in the parent application are illustrated by the following formula

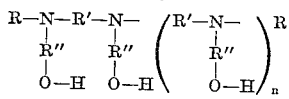

where R is an alkyl group of from 4 to about 50 carbon atoms, R' is an alkylene group of from 2 to about 6 carbon atoms, R'' is an alkylene group of from 2 to about 6 carbon atoms and n is an integer of from 0 to 4.

From the above formula, it will be seen that it is essential that each nitrogen atom contains a hydroxyalkyl group attached thereto and that the terminal nitrogen atoms each contain an alkyl radical attached thereto. This chemical configuration is essential in the compound forming one component of the mixture of the present invention.

Referring to the formula hereinbefore set forth, when $n$ is zero, the compound is an N,N'-dialkyl-N-hydroxyalkylaminoalkyl-alkanolamine, which also may be named N,N'-dialkyl-N,N'-dihydroxyalkyl-alkylenediamine. The alkyl groups preferably are secondary alkyl groups and contain from 4 to about 50 carbon atoms each and preferably from 4 to 20 carbon atoms each. Illustrative preferred compounds in this embodiment include N,N'-di-sec-butyl-N-hydroxyethyl-aminoethyl-ethanolamine,
N,N'-di-sec-pentyl-N-hydroxyethyl-aminoethyl-ethanolamine,
N,N'-di-sec-hexyl-N-hydroxyethyl-aminoethyl-ethanolamine,
N,N'-di-sec-heptyl-N-hydroxyethyl-aminoethyl-ethanolamine,
N,N'-di-sec-octyl-N-hydroxyethyl-aminoethyl-ethanolamine,
N,N'-di-sec-nonyl-N-hydroxyethyl-aminoethyl-ethanolamine,
N,N'-di-sec-decyl-N-hydroxyethyl-aminoethyl-ethanolamine,
N,N'-di-sec-undecyl-N-hydroxyethyl-aminoethyl-ethanolamine,
N,N'-di-sec-dodecyl-N-hydroxyethyl-aminoethyl-ethanolamine,
N,N'-di-sec-tridecyl-N-hydroxyethyl-aminoethyl-ethanolamine,
N,N'-di-sec-pentadecyl-N-hydroxyethyl-aminoethyl-ethanolamine,
N,N'-di-sec-hexadecyl-N-hydroxyethyl-aminoethyl-ethanolamine,
N,N'-di-sec-heptadecyl-N-hydroxyethyl-aminoethyl-ethanolamine,
N,N'-di-sec-octadecyl-N-hydroxyethyl-aminoethyl-ethanolamine,
N,N'-di-sec-nonadecyl-N-hydroxyethyl-aminoethyl-ethanolamine,
N,N'-di-sec-eicosyl-N-hydroxyethyl-aminoethyl-ethanolamine, etc.

The above compounds are illustrative of compounds in which R' and R'' each contain two carbon atoms. It is understood that corresponding compounds are included in which one or both of the groups containing two carbon atoms are replaced by a group containing 3, 4, 5 or 6 carbon atoms.

Referring again to the above formula, when $n$ is 1, the compound of the present invention is named N,N-bis-[N-alkyl-N - (hydroxyalkyl) - aminoalkyl]-alkanolamine which also can be named $N^1,N^3$-dialkyl-$N^1,N^2,N^3$-tri-(hydroxyalkyl)-dialkylenetriamine. Here again, it will be noted that each terminal nitrogen contains an alkyl group and each nitrogen atom contains a hydroxyalkyl group attached thereto. Illustrative preferred compounds in this embodiment include N,N-bis-[N-sec-butyl-N-(2-hydroxyethyl)-aminoethyl]-ethanolamine,
N,N-bis-[N-sec-pentyl-N-(2-hydroxyethyl)-aminoethyl]-ethanolamine,
N,N-bis-[N-sec-hexyl-N-(2-hydroxyethyl)-aminoethyl]-ethanolamine,
N,N-bis-[N-sec-heptyl-N-(2-hydroxyethyl)-aminoethyl]-ethanolamine,
N,N-bis-[N-sec-nonyl-N-(2-hydroxyethyl)-aminoethyl]-ethanolamine,
N,N-bis-[N-sec-decyl-N-(2-hydroxyethyl)-aminoethyl]-ethanolamine,
N,N-bis-[N-sec-undecyl-N-(2-hydroxyethyl)-aminoethyl]-ethanolamine,
N,N-bis[N-sec-dodecyl-N-(2-hydroxyethyl)-aminoethyl]-ethanolamine,
N,N-bis-[N-sec-tridecyl-N-(2-hydroxyethyl)-aminoethyl]-ethanolamine,
N,N-bis-[N-sec-tetradecyl-N-(2-hydroxyethyl)-aminoethyl]-ethanolamine,
N,N-bis-[N-sec-pentadecyl-N-(2-hydroxyethyl)-aminoethyl]-ethanolamine,
N,N-bis-[N-sec-hexadecyl-N-(2-hydroxyethyl)-aminoethyl]-ethanolamine,
N,N-bis-[N-sec-heptadecyl-N-(2-hydroxyethyl)-aminoethyl]-ethanolamine,
N,N-bis-[N-sec-octadecyl-N-(2-hydroxyethyl)-aminoethyl]-ethanolamine,
N,N-bis-[N-sec-nonadecyl-N-(2-hydroxyethyl)-aminoethyl]-ethanolamine,
N,N-bis-[N-sec-eicosyl-N-(2-hydroxyethyl)-aminoethyl]-ethanolamine, etc.

Here again, one or both of the groups containing two carbon atoms may be replaced by a group containing 3, 4, 5 or 6 carbon atoms.

When $n$ is 2, the compound is an $N^1,N^4$-dialkyl-$N^1,N^2,N^3,N^4$-tetrahydroxyalkyl-alkylenepolyamine. Illustrative compounds in this embodiment include $N^1,N^4$-di-sec-butyl-$N^1,N^2,N^3,N^4$-tetra-(2-hydroxyethyl)-triethylenetetramine,
$N^1,N^4$-di-sec-pentyl-$N^1,N^2,N^3,N^4$-tetra-(2-hydroxyethyl)-triethylenetetramine,
$N^1,N^4$-di-sec-hexyl-$N^1,N^2,N^3,N^4$-tetra-(2-hydroxyethyl)-triethylenetetramine,
$N^1,N^4$-di-sec-heptyl-$N^1,N^2,N^3,N^4$-tetra-(2-hydroxyethyl)-triethylenetetramine,
$N^1,N^4$-di-sec-octyl-$N^1,N^2,N^3,N^4$-tetra-(2-hydroxyethyl)-triethylenetetramine,
$N^1,N^4$-di-sec-nonyl-$N^1,N^2,N^3,N^4$-tetra-(2-hydroxyethyl)-triethylenetetramine,
$N^1,N^4$-di-sec-decyl-$N^1,N^2,N^3,N^4$-tetra-(2-hydroxyethyl)-triethylenetetramine,
$N^1,N^4$-di-sec-undecyl-$N^1,N^2,N^3,N^4$-tetra-(2-hydroxyethyl)-triethylenetetramine,
$N^1,N^4$-di-sec-dodecyl-$N^1,N^2,N^3,N^4$-tetra-(2-hydroxyethyl)-triethylenetetramine,
$N^1,N^4$-di-sec-tridecyl-$N^1,N^2,N^3,N^4$-tetra-(2-hydroxyethyl)-triethylenetetramine,
$N^1,N^4$-di-sec-tetradecyl-$N^1,N^2,N^3,N^4$-tetra-(2-hydroxyethyl)-triethylenetetramine,
$N^1,N^4$-di-sec-pentadecyl-$N^1,N^2,N^3,N^4$-tetra-(2-hydroxyethyl)-triethylenetetramine,
$N^1,N^4$-di-sec-hexadecyl-$N^1,N^2,N^3,N^4$-tetra-(2-hydroxyethyl)-triethylenetetramine,
$N^1,N^4$-di-sec-heptadecyl-$N^1,N^2,N^3,N^4$-tetra-(2-hydroxyethyl)-triethylenetetramine,
$N^1,N^4$-di-sec-octadecyl-$N^1,N^2,N^3,N^4$-tetra-(2-hydroxyethyl)-triethylenetetramine,
$N^1,N^4$-di-sec-nonadecyl-$N^1,N^2,N^3,N^4$-tetra-(2-hydroxyethyl)-triethylenetetramine,
$N^1,N^4$-di-sec-eicosyl-$N^1,N^2,N^3,N^4$-tetra-(2-hydroxyethyl)-triethylenetetramine, etc.

Here again, it is understood that one or both of the groups containing two carbon atoms may be replaced by a group containing 3, 4, 5 or 6 carbon atoms.

Referring again to the above formula, when $n$ is 3, the compound will be $N^1,N^5$-dialkyl-$N^1,N^2,N^3,N^4,N^5$-penta-(hydroxyalkyl)-alkylenepolyamine. Illustrative preferred compounds in this embodiment include $N^1,N^5$-di-sec-butyl-$N^1,N^2,N^3,N^4,N^5$-penta-(2-hydroxyethyl)-tetraethylenepentamine,
$N^1,N^5$-di-sec-pentyl-$N^1,N^2,N^3,N^4,N^5$-penta-(2-hydroxyethyl)-tetraethylenepentamine,
$N^1,N^5$-di-sec-hexyl-$N^1,N^2,N^3,N^4,N^5$-penta-(2-hydroxyethyl)-tetraethylenepentamine,
$N^1,N^5$-di-sec-heptyl-$N^1,N^2,N^3,N^4,N^5$-penta-(2-hydroxyethyl)-tetraethylenepentamine,
$N^1,N^5$-di-sec-octyl-$N^1,N^2,N^3,N^4,N^5$-penta-(2-hydroxyethyl)-tetraethylenepentamine,
$N^1,N^5$-di-sec-nonyl-$N^1,N^2,N^3,N^4,N^5$-penta-(2-hydroxyethyl)-tetraethylenepentamine,
$N^1,N^5$-di-sec-decyl-$N^1,N^2,N^3,N^4,N^5$-penta-(2-hydroxyethyl)-tetraethylenepentamine,
$N^1,N^5$-di-sec-undecyl-$N^1,N^2,N^3,N^4,N^5$-penta-(2-hydroxyethyl)-tetraethylenepentamine,
$N^1,N^5$-di-sec-dodecyl-$N^1,N^2,N^3,N^4,N^5$-penta-(2-hydroxyethyl)-tetraethylenepentamine,
$N^1,N^5$-di-sec-tridecyl-$N^1,N^2,N^3,N^4,N^5$-penta-(2-hydroxyethyl)-tetraethylenepentamine,
$N^1,N^5$-di-sec-tetradecyl-$N^1,N^2,N^3,N^4,N^5$-penta-(2-hydroxyethyl)-tetraethylenepentamine,
$N^1,N^5$-di-sec-pentadecyl-$N^1,N^2,N^3,N^4,N^5$-penta-(2-hydroxyethyl)-tetraethylenepentamine,
$N^1,N^5$-di-sec-hexadecyl-$N^1,N^2,N^3,N^4,N^5$-penta-(2-hydroxyethyl)-tetraethylenepentamine,
$N^1,N^5$-di-sec-heptadecyl-$N^1,N^2,N^3,N^4,N^5$-penta-(2-hydroxyethyl)-tetraethylenepentamine,
$N^1,N^5$-di-sec-octadecyl-$N^1,N^2,N^3,N^4,N^5$-penta-(2-hydroxyethyl)-tetraethylenepentamine,
$N^1,N^5$-di-sec-nonadecyl-$N^1,N^2,N^3,N^4,N^5$-penta-(2-hydroxyethyl)-tetraethylenepentamine,
$N^1,N^5$-di-sec-eicosyl-$N^1,N^2,N^3,N^4,N^5$-penta-(2-hydroxyethyl)-tetraethylenepentamine, etc.

Here again, it is understood that one or both of the groups containing two carbon atoms may be replaced by a group containing 3, 4, 5 or 6 carbon atoms.

Referring again to the above formula, when $n$ is 4, the compound will be $N^1,N^6$-dialkyl-$N^1,N^2,N^3,N^4,N^5,N^6$-hexa-(hydroxyalkyl)-pentaethylenehexamine. Illustrative preferred compounds in this embodiment include $N^1,N^6$-di-sec-butyl-$N^1,N^2,N^3,N^4,N^5,N^6$-hexa-(2-hydroxyethyl)-pentaethylenehexamine,
$N^1,N^6$-di-sec-pentyl-$N^1,N^2,N^3,N^4,N^5,N^6$-hexa-(2-hydroxyethyl)-pentaethylenehexamine,
$N^1,N^6$-di-sec-hexyl-$N^1,N^2,N^3,N^4,N^5,N^6$-hexa-(2-hydroxyethyl)-pentaethylenehexamine,
$N^1,N^6$-di-sec-heptyl-$N^1,N^2,N^3,N^4,N^5,N^6$-hexa-(2-hydroxyethyl)-pentaethylenehexamine,
$N^1,N^6$-di-sec-octyl-$N^1,N^2,N^3,N^4,N^5,N^6$-hexa-(2-hydroxyethyl)-pentaethylenehexamine,
$N^1,N^6$-di-sec-nonyl-$N^1,N^2,N^3,N^4,N^5,N^6$-hexa-(2-hydroxyethyl)-pentaethylenehexamine,
$N^1,N^6$-di-sec-decyl-$N^1,N^2,N^3,N^4,N^5,N^6$-hexa-(2-hydroxyethyl)-pentaethylenehexamine,
$N^1,N^6$-di-sec-undecyl-$N^1,N^2,N^3,N^4,N^5,N^6$-hexa-(2-hydroxyethyl)-pentaethylenehexamine,
$N^1,N^6$-di-sec-dodecyl-$N^1,N^2,N^3,N^4,N^5,N^6$-hexa-(2-hydroxyethyl)-pentaethylenehexamine,
$N^1,N^6$-di-sec-tridecyl-$N^1,N^2,N^3,N^4,N^5,N^6$-hexa-(2-hydroxyethyl)-pentaethylenehexamine,
$N^1,N^6$-di-sec-tetradecyl-$N^1,N^2,N^3,N^4,N^5,N^6$-hexa-(2-hydroxyethyl)-pentaethylenehexamine,
$N^1,N^6$-di-sec-pentadecyl-$N^1,N^2,N^3,N^4,N^5,N^6$-hexa-(2-hydroxyethyl)-pentaethylenehexamine,
$N^1,N^6$-di-sec-hexadecyl-$N^1,N^2,N^3,N^4,N^5,N^6$-hexa-(2-hydroxyethyl)-pentaethylenehexamine,
$N^1,N^6$-di-sec-heptadecyl-$N^1,N^2,N^3,N^4,N^5,N^6$-hexa-(2-hydroxyethyl)-pentaethylenehexamine,
$N^1,N^6$-di-sec-octadecyl-$N^1,N^2,N^3,N^4,N^5,N^6$-hexa-(2-hydroxyethyl)-pentaethylenehexamine,
$N^1,N^6$-di-sec-nonadecyl-$N^1,N^2,N^3,N^4,N^5,N^6$-hexa-(2-hydroxyethyl)-pentaethylenehexamine,
$N^1,N^6$-di-sec-eicosyl-$N^1,N^2,N^3,N^4,N^5,N^6$-hexa-(2-hydroxyethyl)-pentaethylenehexamine, etc.

Here again, it is understood that one or both of the groups containing two carbon atoms may be replaced by a group containing 3, 4, 5 or 6 carbon atoms.

As hereinbefore set forth, in a preferred embodiment the alkyl groups attached to the terminal nitrogen atoms are secondary alkyl groups. In another embodiment, these groups may be cycloalkyl groups and particularly cyclohexyl, alkylcyclohexyl, dialkylcyclohexyl, etc., although they may comprise cyclobutyl, cyclopentyl, cycloheptyl, cyclooctyl, etc., and alkylated derivatives thereof. The cycloalkyl groups may be considered as corresponding to secondary alkyl groups. The secondary alkyl configuration is definitely preferred although, when desired, the alkyl groups attached to the terminal nitrogen atoms may be normal alkyl groups but not necessarily with equivalent results.

The compounds illustrated in the above formula are prepared by first reductively alkylating an alkylenepolyamine and then subjecting the resultant alkylenepolyamine containing alkyl groups attached to the terminal nitrogen atoms to oxyalkylenation. Accordingly, the oxyalkylenation is performed on alkylenepolyamines containing only secondary nitrogen atoms. There are no primary nitrogen atoms available and, therefore, will not result in the formation of a nitrogen atom containing two hydroxyalkyl groups. As hereinbefore set forth, it is an essential requirement that these compounds comprise those in which the terminal nitrogen atoms each contain an alkyl group attached thereto and each of the nitrogen atoms contains one and only one hydroxyalkyl group attached thereto.

As hereinbefore set forth, the above compounds are prepared by first subjecting an alkylene polyamine to reductive alkylation. The alkylenepolyamines include ethylenediamine, diethylenetriamine, triethylenetetramine, tetraethylenepentamine, pentaethylenehexamine and corresponding alkylenepolyamines in which the ethylene group or groups are replaced by propylene, butylene, pentylene and/or hexylene groups. In order to prepare the preferred compounds in which the alkyl groups are of secondary alkyl groups, the reductive alkylation is effected using a ketone. Any suitable ketone may be used and will be selected to produce the desired secondary alkyl groups to be attached to the terminal nitrogen atoms. Illustrative preferred ketones include methyl ethyl ketone, methyl propyl ketone, methyl butyl ketone, methyl pentyl ketone, methyl hexyl ketone, methyl heptyl ketone, methyl octyl ketone, methyl nonyl ketone, methyl decyl ketone, methyl undecyl ketone, methyl dodecyl ketone, methyl tridecyl ketone, methyl tetradecyl ketone, methyl pentadecyl ketone, methyl hexadecyl ketone, methyl heptadecyl ketone, methyl octadecyl ketone, etc., diethyl ketone, ethyl propyl ketone, ethyl butyl ketone, ethyl pentyl ketone, ethyl hexyl ketone, ethyl heptyl ketone, ethyl octyl ketone, ethyl nonyl ketone, ethyl decyl ketone, ethyl undecyl ketone, ethyl dodecyl ketone, ethyl tridecyl ketone, ethyl tetradecyl ketone, ethyl pentadecyl ketone, ethyl hexadecyl ketone, ethyl heptadecyl ketone, etc., dipropyl ketone, propyl butyl ketone, propyl pentyl ketone, propyl hexyl ketone, propyl heptyl ketone, propyl octyl ketone, propyl nonyl ketone, propyl decyl ketone, propyl undecyl ketone, propyl dodecyl ketone, propyl tridecyl ketone, propyl tetradecyl ketone, propyl pentadecyl ketone, propyl hexadecyl ketone, etc., dibutyl ketone, butyl pentyl ketone, butyl hexyl ketone, butyl heptyl ketone, butyl octyl ketone, butyl nonyl ketone, butyl decyl ketone, butyl undecyl ketone, butyl dodecyl ketone, butyl tridecyl ketone, butyl tetradecyl ketone, butyl pentadecyl ketone, etc., dipentyl ketone, pentyl hexyl ketone, pentyl heptyl ketone, pentyl octyl ketone, pentyl nonyl ketone, pentyl decyl ketone, pentyl undecyl ketone, pentyl dodecyl ketone, pentyl tridecyl ketone, pentyl tetradecyl ketone, etc., dihexyl ketone, hexyl heptyl ketone, hexyl octyl ketone, hexyl nonyl ketone, hexyl decyl ketone, hexyl undecyl ketone, hexyl dodecyl ketone, hexyl tridecyl ketone etc., diheptyl ketone, heptyl octyl ketone, heptyl nonyl ketone, heptyl decyl ketone, heptyl undecyl ketone, heptyl dodecyl ketone, etc., dioctyl ketone, octyl nonyl ketone, octyl decyl ketone, octyl undecyl ketone, etc., dinonyl ketone, nonyl decyl ketone, didecyl ketone, etc. It is understood that the ketones may be of straight or branched chain configuration. Ketones are available commercially or they may be synthesized as required. A number of ketones and particularly the higher boiling ketones are available as mixtures which are either products or byproducts of commercial operations. These mixtures generally are available at comparatively low cost and, as another advantage of the present invention, the mixtures may be used without the added time and expense of separating specific compounds in pure state. One such mixture available commercially is "Stearone" which is diheptadecyl ketone.

The reductive alkylation of the ketone and alkylenepolyamine is effected in any suitable manner. The reaction is effected using at least two moles of ketone per mole of alkylenepolyamine and generally an excess of the ketone, which may range up to about twenty mole proportions of ketone per one mole proportion of alkylenepolyamine, is employed to insure complete reaction. In one embodiment the reaction is effected in the presence of hydrogen and a suitable alkylation catalyst in one step, which may be either continuous or batch type operation. Any suitable reductive alkylation catalyst is employed including those containing nickel, platinum palladium, etc., preferably composited with a suitable support. A particularly preferred catalyst comprises a composite of platinum and alumina, which may or may not contain combined halogen. The platinum generally is present in the catalyst in a concentration of from about 0.1 to about 2% by weight of the final catalyst and the halogen, when present, is in a concentration of total halogen of from about 0.01% to about 1% by weight of the final catalyst, the halogen preferably comprising fluorine and/or chlorine. Another suitable catalyst comprises an intimate mixture of copper oxide, chromium oxide and barium oxide. When using the platinum catalyst, the temperature generally will be within the range of from about 200° to about 500° F. and a hydrogen pressure of from about 100 to about 3000 pounds per square inch or more.

In a continuous type operation, the catalyst is disposed as a fixed bed in a reaction zone and the alkylenepolyamine, ketone and hydrogen, at the required temperature and pressure, are passed through the catalyst in either upward or downward flow. The reactor effluent is separated into a hydrogen stream and unreacted products, all or part of which may be recycled to the reaction zone, and the desired terminally alkylated alkylenepolyamine is separated from other high boiling products, if any. In a batch type operation, the alkylenepolyamine, ketone and catalyst are disposed in a reaction zone which is pressured with hydrogen and then heated to the desired temperature. After cooling, the products are separated to recover the desired terminally alkylated alkylenepolyamine. While the one-step process generally is preferred, it is understood that the reaction may be effected in two steps. In the first step, effected in the absence of hydrogen, the Schiff's base is first prepared and then is hydrogenated in a separate step to form the desired terminally alkylated alkylenepolyamine.

The terminally alkylated alkylenepolyamine, prepared in the above manner, then is subjected to oxyalkylenation. The oxyalkylenation is readily effected by charging the terminally alkylated alkylenepolyamine into a reaction zone and passing alkylene oxide, particularly ethylene oxide, into contact with the alkylenepolyamine. The alkylene oxide will be used in a proportion of at least one mole thereof per each nitrogen atom in the alkylenepolyamine. For example, when N,N'-dialkyl-ethylenediamine is to be oxyalkylenated, at least two moles of alkylene oxide are used per mole of ethylenediamine. Usually an excess of the alkylene oxide is employed in order to insure complete reaction. This reaction readily occurs at a low temperature which may range from room temperature to 300° F. in the absence of a catalyst. As hereinbefore set forth, ethylene oxide is preferred. Other alkylene oxides include propylene oxide, butylene oxide, pentylene oxide, hexylene oxide, etc., as well as styrene oxide, epichlorohydrin, etc. It is understood that the R" alkylene group may be substituted by such groups as phenyl, alkoxy, thio-oxy, halo, hydroxy, etc. It will be noted that the alkylated alkylenepolyamine contains only secondary nitrogen atoms and accordingly the oxyalkylenation will result in each nitrogen atom containing only one oxyalkylene group.

In accordance with the present invention, the compound of the formula hereinbefore set forth is used in conjunction with another compound or compounds and particularly an alkylphenol and more particularly a trialkylphenol. A specially preferred trialkylphenol is 2,6-ditertiary-butyl-4-methyl-phenol. Another preferred trialkylphenol is 1,1,3 - tris-(2-methyl-4-hydroxy-t-tertiary-butylphenyl)-butane. Other trialkylphenols include 2,4-dimethyl-6-tertiarybutyl-phenol, 2446 (American Cyanamid) [2,2' - methylene-bis-(4-methyl-6-tertiary-butyl-phenol)], 425 (American Cyanamid) [2,2′-methylene-bis-(4-ethyl-6-tertiarybutyl-phenol)], 702 (Ethyl Corporation) [4,4′ - methylene-bis-(2,6-ditertiarybutyl-phenol)], etc. Still other alkylphenols include Santonox R, Santo-white [4,4′-thiobis-(6-tertiarybutyl-meta-cresol)], Santowhite L [thiobis-(di-sec-amyl-phenol)], Santowhite Powder [4,4′ - butylidene-bis-(6-tertiary-butyl-meta-cresol)], 703 (Ethyl Corporation) (2,6-ditertiarybutyl-alpha-dimethylamino - para - cresol), 720 (Ethyl Corporation) [4,4′ - methylene-bis-(6-tertiary-butyl-ortho-cresol)], 736 (Ethyl Corporation) [4,4′-thiobis-(6-tertiarybutyl-orthocresol)], 762 (Ethyl Corporation) (2,6-ditertiarybutyl-alpha - methoxy-p-cresol), 4,4′,4″-methyne-tris-(2,6-ditertiarybutyl-phenol), 4,4′,4″ - methyne-tris-(2-methyl-6-tertiarybutyl-phenol), 2,4,6 - tris-[4-hydroxy-3,5-ditertiarybutylbenzyl]-mesitylene, etc. Still other compounds for use in the composition of the present invention will be of the phenolic and/or amine type, including dialkylated phenols, other trialkylated phenols, phenyl-alpha-naphthylamine, phenyl - beta - naphthylamine, phenothiazine, Nonox WSP, Nonox C1, alkylalkoxyphenols, diphenyl-p-phenylenediamine, Salol (salicylic acid esters), p-octyl-phenylsalicylate, various phosgene alkylated phenol reaction products, various alkoxyalkyldihydroxybenzophenones, polyalkyldihydroxybenzophenones, tetrahydroxybenzophenones, 2,4,5 - trihydroxybutyrophenone, various (hydroxy-alkylphenyl)-benzotriazoles, (hydroxyalkoxyphenol)-benzotriazoles, etc. Other compounds include nickel-bis-dithiocarbamates, nickel-bis - dihydroxypolyalkylphenol sulfides, dilauryl beta-mercaptodipropionate, dihydroxytetraalkyl sulfides, dihydroxytetraalkyl methanes, various trithiophosphites as trilaurylthiophosphite, dialkylphosphites, trialkylphosphites, high molecular weight nitriles, various Mannich bases, etc.

As hereinbefore set forth, the mixture of the present invention offers advantages for use as additive in organic substrates. For example, particularly improved results are obtained in the stabilization of plastics, apparently due to a synergistic effect, when the composition of the present invention contains a phenolic compound and particularly a trialkylphenol. The above compound will be used in the mixture in a concentration of from about 1% to about 75% by weight of the compound illustrated by the formula hereinbefore set forth. It is understood that the mixture of the present invention may be used in conjunction with other additives which are incorporated in the organic substrate for particular purposes. Thus, the mixture of the present invention may be used in admixture with additional antioxidant, metal deactivator, dye, detergent, etc.

The novel mixtures of the present invention possess varied utility. They are of exceptional utility in substrates exposed to weather and in this embodiment the mixtures of the present invention serve as weathering stabilizers. Although the mechanism in which these mixtures function is not completely understood, these mixtures serve to protect substrates which undergo ultraviolet light induced oxidation. It is believed that the mixtures of the present invention preferentially become oxidized during such ultraviolet exposure and form oxidized derivatives. The oxidized derivatives apparently serve as effective weathering stabilizers and thus the mixtures of the present invention appear unique in effectively stabilizing the substrate for a long period of time. In addition, the mixtures of the present invention possess anti-static properties and adhesion improving properties. Furthermore, they are of ready solubility in most substrates. The substrates normally subject to exposure to weather include plastics, resins, paints, other coatings, etc. In addition the mixtures are useful as dye sites and by themselves do not impart color to the plastics, resins, paints or other coatings.

Illustrative plastics which are stabilized by the novel compounds of the present invention include polyolefins and particularly polyethylene, polypropylene, polybutylene, mixed ethylene propylene polymers, mixed ethylene butylene polymers, mixed propylene butylene polymers, etc. The solid olefin polymers are used in many applications including electrical insulation, lightweight outdoor furniture, awnings, cover for greenhouses, etc. In many of these applications the solid olefin polymer is exposed to sunlight and air.

Another plastic being used commerically on a large scale is polystyrene. The polystyrene type resins are particularly useful in the manufacture of molded or machine articles which find application in such goods as windows, optical goods, automobile panels, molded household articles, etc. One disadvantage of polystyrene is its tendency to deteriorate when exposed to direct sunlight and air for extended periods of time.

Another class of plastics available commerically is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, polyvinyl butyral etc., or mixtures thereof.

Other plastics being used commercially on a large scale are in the textile class and include nylon (polyamide), Perlon L or 6-nylon (polyamide), Dacron (terepthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), rayon, etc. Here again, deterioration occurs due to ultraviolet light and oxidation.

Still other plastics are prepared from other monomers and are available commerically. Illustrative examples of such other solid polymers include phenolformaldehyde resins, urea-formaldehyde resins, melamine-formaldehyde resins, acryloid plastics which are derived from methyl, ethyl and higher alkyl acrylates and methacrylates as monomers used in the polymerization. Also included in the solid polymers are the polyurethane foams which are becoming increasingly available on a large scale and polyacetals, especially polyformaldehydes such as "Delrin" and "Celcon." Still other resins are the epoxy resins which also are used outdoors and undergo deterioration due to ultraviolet light and oxidation. Other substrates include vinyl, urethane, acrylic, nitrocellulose based coatings; especially cellulose acetate, cellulose acetate butyrate, ethyl cellulose, etc. Still other substrates are polyesters, including linear or cross-linked, reinforced polyesters, laminate polyesters, etc., various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), Buna N (copolymer of butadiene and acrylonitrile), butyl rubber (copolymer of butadiene and isobutylene), Neoprene rubber (chloroprene polymer), Thiokol rubber (polysulfide), silicone rubber, etc. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

The above are illustrative examples of various plastics and resins which are improved by the additives of the present invention. As hereinbefore set forth, still other substrates include paints, varnishes, drying oils, pigments, rust preventive coatings, wax coatings, protective coatings, etc. It is understood that the compounds of the present invention may be used in any coating which is subject to exposure to ultraviolet light, oxidation, heat, etc. While the compounds are especially useful in materials subject to such exposure, it is understood that the compounds of the present invention also may be used advantageously in other coatings, plastics, resins, paints, etc., which normally are not exposed outdoors.

The compounds of the present invention also are of utility as additives in other organic substrates including, for example, hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. In the oils, the compounds of the present invention serve to inhibit oxidative deterioration, thermal deterioration, etc., thereby retarding and/or preventing sediment formation, dispersion of sediment when formed, preventing and/or retarding discoloration, rust or corrosion inhibitor, detergent, etc.

The additive mixture of the present invention will be used in a stabilizing concentration which will depend upon the particular substrate. The additive mixture may be used in a concentration as low as 0.001% to about 25% but generally will be used in a concentration of from about 0.01% to about 5% by weight of the substrate. The additive mixture is incorporated in the substrate in any suitable manner. For example, when it is incorporated into a plastic, resin or the like, it may be added to the hot melt, generally in a Banbury mixer, extruder or other device. When it is added to a liquid, it is incorporated into the liquid with intimate stirring. When it is added to a multi-component mixture as, for example, grease, it may be added to one of the components and, in this manner, incorporated into the final mix or it may be added directly into the final mix.

The additive mixture of the present invention may be utilized as such or prepared as a solution in a suitable solvent including alcohols and particularly methanol, ethanol, propanol, butanol, etc., hydrocarbons and particularly benzene, toluene, xylene, cumene, Decalin, etc.

The following examples are introduced to illustrate further the novelty and utility of the present invention but not with the invention of unduly limiting the same.

*Example I*

A compound for use in the mixture of the present invention is N,N' - di - sec - octyl-N-hydroxyethyl-aminoethylethanolamine [also can be named N,N'-di-sec-octyl-N,N'-di-(2-hydroxyethyl)-ethylenediamine] and was prepared by reacting one mole proportion of N,N'-bis-(1-methylheptyl)-ethylenediamine with two mole proportions of ethylene oxide. The oxyethylenation was effected by intimately mixing the reactants in a turbomixer at a temperature of about 240° F. and a pressure of about 250 p.s.i. for about two hours. The product was recovered as a liquid boiling at 188° C. at 0.4 mm. Hg and having an index of refraction $n_D^{20}$ of 1.4705, basic nitrogen content of 5.37 meq./g., hydroxyl content of 4.5 meq./g. and a G.L.C. purity of 98%.

*Example II*

Another compound for use in the mixture of the present invention is N,N - bis - [N-sec-octyl-N-(2-hydroxyethyl)-aminoethyl]-ethanolamine, which also may be named $N^1$, $N^3$ - di - sec-octyl-$N^1$,$N^2$,$N^3$-tri-(2-hydroxyethyl)-diethylenetriamine. The compound was prepared by reacting one mole proportion of $N^1$,$N^3$-bis-(1-ethyl-3-methylpentyl)-diethylenetriamine with three mole proportions of ethylene oxide in a turbomixer at a temperature of about 212° F. for four hours. The product was recovered as a light colored liquid boiling at 233–235° C. at 0.5 mm. Hg having a basic nitrogen content of 6.58 meq./g. and a hydroxyl content by acetylation method of 5.75 meq./g.

*Example III*

A homogeneous mixture was prepared by dissolving 7.5 parts by weight of 2,6-ditertiarybutyl-4-methylphenol in 100 parts by weight of N,N'-di-sec-octyl-N-hydroxyethylaminoethylethanolamine. The butylated hydroxytoluene was readily soluble in the N,N'-di-sec-octyl-N-hydroxyethylaminoethylethanolamine and resulted in a homogeneous solution.

*Example IV*

As hereinbefore set forth, the mixture of the present invention is of exceptional utility as an additive in plastics. The plastic of this example is polyethylene. The polyethylene was a special batch of commercial polyethylene and was obtained free of inhibitors in order that it may be used as a proper control sample to evaluate the effect of the inhibitor. The solid polyethylene is of the high density type and the inhibited product is marketed commercially under the trade name of Fortiflex by the Celanese Corporation of America. The polyethylene was milled in a two-roll heated mill of conventional commercial design and the inhibitor was incorporated in the sample during the milling. The samples were pressed into sheets of about 17 mil thickness and cut into plaques of about 1⅜″ x 1½″. The plaques were exposed to weathering on an outdoor rack facing south and inclined at a 45° angle at Des Plaines, Ill. The samples were analyzed periodically by infrared analysis and the intensity of the carbonyl band at 1715 cm.$^{-1}$ was determined and reported as "carbonyl number." The higher intensity of the carbonyl band indicates a higher carbonyl concentration (expressed as carbonyl number) and accordingly increased deterioration.

Deterioration of the polyolefin exposed outdoors increases rapidly during the late spring, summer and early fall months. A sample of the polyethylene without inhibitor, when exposed outdoors in about the middle of May, underwent an increase in carbonyl number to above 720 by the end of August. Another sample of the same polyethylene without the inhibitor, when placed outdoors in the beginning of January, increased in carbonyl number from an initial of about 25 to about 90 by the beginning of May and then shot up to over 500 by the middle of July.

The additive of this example is the mixture of N,N'-di-sec-octyl-N-hydroxyethyl-aminoethylethanolamine and butylated hydroxytoluene described in Example III. The mixture was incorporated in the polyethylene described above in a concentration of 1.075% by weight. The sample was placed outdoors at the end of April and, when evaluated in the manner described above, the carbonyl number increased from an initial of 20 to only about 48 by the middle of August and to only 71 after 352 days. Accordingly, in almost a year, the carbonyl number increase was very low. This sample has been exposed outdoors for a total of 526 days and the carbonyl number has increased to only 114 after this long period of exposure. After 847 days of outdoor exposure, the carbonyl number has increased to only 147. No brittleness, crazing or cracking has been observed at this time of exposure.

Another very important property of the additive mixture of the present invention is that the polyethylene remained white in color during all of the exposure. It is readily seen that an additive which both very effectively protects the plastic without causing discoloration thereof is exceptional and of high utility.

*Example V*

A mixture of butylated hydroxytoluene and the compound of Example II also was evaluated as an additive in the polyethylene in the same manner as described in Example IV. One percent by weight of N,N-bis-[N-sec-octyl-N-(2-hydroxyethyl)-aminoethyl]-ethanolamine, prepared as described in Example II, and 0.075% by weight of butylated hydroxytoluene were incorporated in another sample of the polyethylene described in Example IV. The polyethylene was evaluated by outdoor exposure in the same manner as heretofore described. The sample was placed outdoors at the end of April and the carbonyl number increased from an initial of 32 to only 95 by the middle of September and to only 112 after 352 days (almost a year) of outdoor exposure. After 526 days the carbonyl number was only 180. Here again, no darkening, brittleness, crazing or cracking has been noticed.

*Example VI*

Evaluations of the polyethylene described in Example IV also were made in a Weather-Ometer. The Weather-Ometer was operated without the use of water sprays. The samples of polyethylene were prepared in substantially the same manner as described in Example IV and the plaques were inserted into plastic holders, affixed onto a rotating drum and exposed to carbon arc rays at about 125° F. in the Weather-Ometer. Here again, the samples were examined periodically by infrared analysis to determine the carbonyl band at 1715 cm.$^{-1}$.

A sample of the polyethylene without inhibitor, when evaluated in the Weather-Ometer, increased from a carbonyl number of 28 to 855 within 624 hours. In contrast, another sample of the polyethylene containing 1% by weight of N,N'-di-sec-octyl - N - hydroxyethylene-aminoethylethanolamine, prepared as described in Example I, and 0.075% by weight of butylated hydroxytoluene developed a carbonyl number of only 250 after 1392 hours. Here again, the sample remained white throughout the complete evaluation.

*Example VII*

Evaluations in the Weather-Ometer also were made using another sample of the polyethylene described in Example IV and containing 1% by weight of N,N-bis-[N-sec-octyl - N - (2-hydroxyethyl)-aminoethyl]-ethanolamine, prepared as described in Example II, and 0.075% by weight of butylated hydroxytoluene.

When evaluated in the Weather-Ometer in the same manner as described in Example VI, the polyethylene increased from an initial carbonyl number of 32 to only 254 after 1392 hours. The sample remained white throughout the complete evaluation. Here again, the effectiveness of the inhibitor mixture of the present invention is demonstrated.

*Example VIII*

The additive mixture of this example comprised 1% by weight of N,N'-di-sec-octyl-N-hydroxyethyl-aminoethylethanolamine, prepared as described in Example I, and 0.1% by weight of 1,1,3-tris-(2-methyl-4-hydroxy-5-tertiarybutylphenyl)-butane. The additive mixture was incorporated in polyethylene in substantially the same manner as described in Example IV, after which the polyethylene was exposed outdoors and evaluated in the same manner. However, in this evaluation the polyethylene was a special batch of a different polyethylene and was obtained free of inhibitor.

The following table reports the carbonyl number increase of samples exposed outdoors for 257 days.

TABLE I

| Additive: | Carbonyl number after 257 days outdoors |
|---|---|
| None | *>1000 |
| 0.1% by wt. of 1,1,3-tris-(2-methyl-4-hydroxy-5-tertiarybutyl-phenyl)-butane | 600 |
| 1% by wt. of N,N'-di-sec-octyl-N-hydroxyethyl-aminoethyl-ethanolamine and 0.1% by wt. of 1,1,3-tris-(2-methyl-4-hydroxy-5-tertiary-butyl-phenyl)-butane | 97 |

* Within 132 days.

From the data in the above table, it will be seen that the additive mixture served to effectively inhibit deterioration of the polyethylene.

*Example IX*

Evaluations were made in the same manner as described in Example VIII, but using other samples of the polyethylene described in Example IV.

A sample of the polyethylene containing only 0.1% of 1,1,3-tris-(2-methyl-4-hydroxy - 5 - tertiarybutyl-phenyl)-butane reached a carbonyl number of 492 after 271 days of outdoor exposure, but another sample containing 0.1% of the above compound and 1% by weight of N,N'-di-sec-octyl - N - hydroxyethyl - aminoethyl - ethanolamine reached a carbonyl number of only 85 after 271 days of outdoor exposure.

*Example X*

The additive mixture of this example comprises 1% by weight of N,N - bis - [N-sec-pentatriacontyl-N-(2-hydroxyethyl) - aminoethyl] - ethanolamine and 0.2% by weight of 2,2' - methylene-bis-(4-methyl-6-tertiarybutylphenol). The first mentioned compound also may be named N$^1$,N$^3$ - di-sec-pentatriacontyl-N$^1$,N$^2$,N$^3$-tri-(2-hydroxyethyl)-diethylenetriamine. It was prepared by first reductively alkylating one mole proportion of diethylenetriamine with two mole proportions of pentatriacontanone to prepare N$^1$,N$^3$ - di - pentatriacontyl-diethylenetriamine. 108 g. (0.1 mole) of N$^1$,N$^3$-di-pentatriacontyl-diethylenetriamine then were reacted with 25 g. (0.4 mole) of ethylene oxide at 212° F. for seven and one-half hours. N,N - bis - [N-pentatriacontyl-N-(2-hydroxyethyl)-aminoethyl]-ethanolamine was recovered as a solid having an equivalent weight of 463 which corresponds to the theoretical equivalent weight of 405.

The above additive mixture is used in a concentration of 1.5% by weight in polystyrene by being added to styrene and then the mixture is polymerized by heating at a temperature of about 250° F. for seven days. The resulting resin is molded at a temperature of about 320° F. into plates. The effect of the additive is determined by exposing outdoors three plates containing the additive and three plates of polystyrene prepared in the same manner but not containing the additive. The samples of polystyrene containing the additive will undergo substantially no deterioration and will be substantially unchanged in color for a long period of time.

*Example XI*

The additive mixture of this example comprises 4 parts by weight of N,N'-di-sec-octyl-N-hydroxyethyl-aminoethyl-ethanolamine, prepared as described in Example I, and 1 part by weight of 2,4,6-tris-(4-hydroxy-3,5-di-tertiary-butyl-benzyl)-mesitylene. The additive mixture is used in a concentration of 2% by weight in solid polypropylene. The polypropylene is available commercially under the trade name of "Moplen." The additive mixture is incorporated into the polypropylene during milling in conventional manner. Samples of the polypropylene, with and without additive, are pressed into sheets and then may be evaluated either in the Weather-Ometer or by outdoor exposure. The samples containing the additive mixture of the present invention will resist deterioration when evaluated in either of these methods for a considerably longer period of time than the samples without additive.

*Example XII*

The additive mixture of Example III is used in a concentration of 0.001% by weight as an additive in burner oil. The burner oil is evaluated in a method referred to as the Erdco Test. In this method, heated oil is passed through a filter, and the time required to develop a differential pressure across the filter of 25 in. Hg is determined. It is apparent that the longer the time, the more effective is the additive. However, with a very effective additive, the time to reach a differential pressure across the filter of 25 in. Hg is lengthened beyond reasonable limits that the test is stopped after about 300 minutes and the differential pressure at that time is reported. A control sample of the burner oil (not containing an additive) developed a differential pressure across the filter of 25 in. Hg in about 125 minutes. In contrast, the sample of burner oil containing the additive of this example will develop a differential pressure across the filter of less than 1 in. Hg after 300 minutes.

I claim as my invention:

1. A mixture consisting essentially of an alkylphenol selected from the group consisting of dialkyl- and trialkylphenols and a compound of the following formula

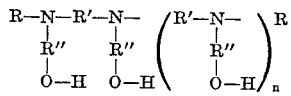

where R is an alkyl group of from 4 to about 50 carbon atoms, R' is an alkylene group of from 2 to about 6 carbon atoms, R" is an alkylene group of from 2 to about 6 carbon atoms and $n$ is an integer of from 0 to 4, said mixture containing from about 1% to about 75% by weight of said alkylphenol.

2. The mixture of claim 1 wherein said alkylphenol is a trialkylphenol.

3. The mixture of claim 2 wherein said trialkylphenol is 2,6-ditertiarylbutyl-4-methyl-phenol.

4. The mixture of claim 2 wherein said trialkylphenol is 1,1,3-tris-(2-methyl-4-hydroxy-5-tertiarybutyl-phenyl)-butane.

5. The mixture of claim 1 wherein said compound is N,N'-dialkyl-N-hydroxyalkyl-aminoalkyl-alkanolamine.

6. The mixture of claim 1 being a mixture of N,N'-di-sec-octyl-N-hydroxyethyl-aminoethylethanolamine and from about 1% to about 75% by weight thereof of 2,6-di-tertiarylbutyl-4-methylphenol.

7. The mixture of claim 1 being a mixture of N,N'-di-sec-octyl-N-hydroxyethyl-aminoethylethanolamine and from about 1% to about 75% by weight thereof of 1,1,3-tris-(2-methyl-4-hydroxy-tertiarybutyl-phenol)-butane.

8. The mixture of claim 1 being a mixture of N,N'-di-sec-octyl-N-hydroxyethyl-aminoethylethanolamine and from about 1% to about 75% by weight thereof of 2,2'-methylene-bis-(4-methyl-6-tertiary-butyl-phenol).

References Cited

UNITED STATES PATENTS 3,155,625   11/1964   Long et al. _____ 252—404 X

FOREIGN PATENTS 585,754   10/1959   Canada.

OTHER REFERENCES

Rosenwald et al.: Industrial and Engineering Chemistry, vol. 42 (No. 1), January 1950, pp. 162–165.

LEON D. ROSDOL, *Primary Examiner.*

I. GLUCK, *Assistant Examiner.*